Dec. 4, 1951     E. B. HEDGPETH     2,577,244
SPRING CASTER WHEEL ASSEMBLY FOR
AUTOMOTIVE COUPLERS AND THE LIKE
Filed Oct. 28, 1947
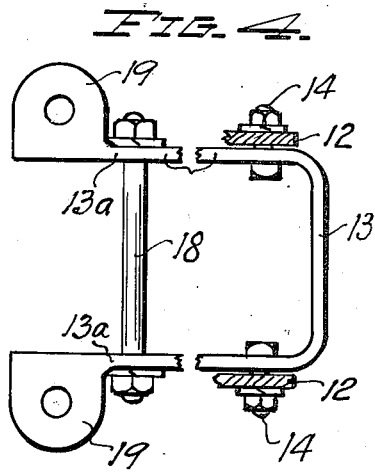
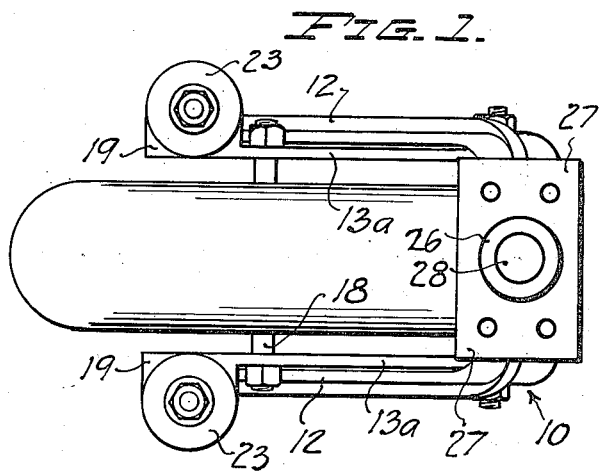
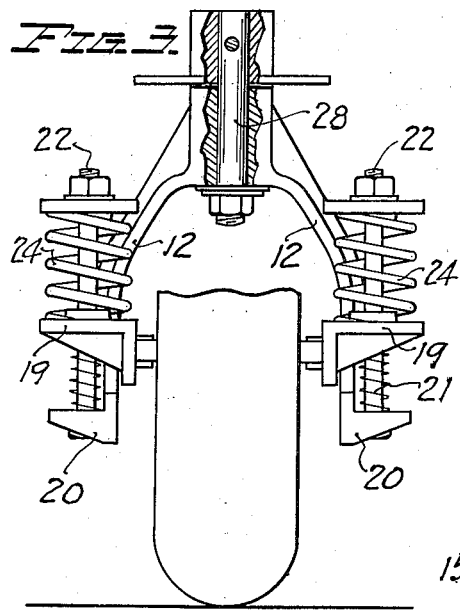
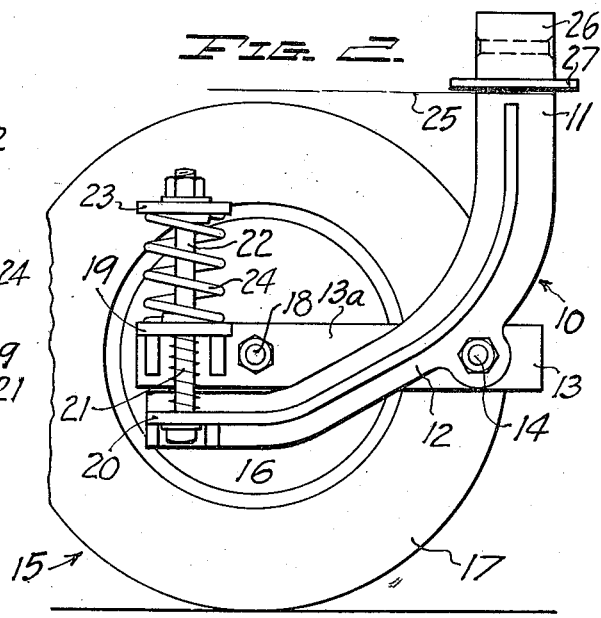
Inventor:
EDWARD B. HEDGPETH,
By   *[signature]* and
    *[signature]*
             Attorneys.

Patented Dec. 4, 1951

2,577,244

UNITED STATES PATENT OFFICE 2,577,244

SPRING CASTER WHEEL ASSEMBLY FOR AUTOMOTIVE COUPLERS AND THE LIKE

Edward B. Hedgpeth, Salt Lake City, Utah

Application October 28, 1947, Serial No. 782,506

8 Claims. (Cl. 16—44)

This invention relates to a spring caster wheel assembly, and more particularly, a spring caster wheel that is used in connection with automotive equipment, such as dolly couplers for coupling trailers to automotive units.

The principal object of the invention is to provide a spring caster wheel assembly that has a high degree of flexibility and that in operation is quickly responsive to directional variations. Specific objects are to provide:

An assembly in which a minimum headroom is required between the top of the caster wheel and a vehicle chassis, thus permitting the wheel to have a maximum diameter;

An assembly that is simple, compact and durable;

An assembly having an appreciable degree of cushioning for taking up road shocks on the wheel.

Other objects will become self-evident as the following description progresses.

According to the invention a double-fulcrum connection is provided between point of application of the load and the wheel axle, whereby a maximum degree of flexibility is obtained with a minimum of headroom. One fulcrum is spaced apart from the wheel center and is located almost directly below load, while the other fulcrum coincides with the wheel axis. A spring assembly is located on the far side of the wheel axis with respect to the spaced fulcrums and therefore absorbs the force of any moment exerted about either fulcrum.

In the accompanying drawing, which illustrates one embodiment of the invention,

Fig. 1 represents a plan;

Fig. 2, a side elevation;

Fig. 3, an end elevation, a portion of the wheel being broken away to bring otherwise hidden parts into view; and Fig. 4, a plan of a detail apart from the assembly.

Referring to the drawing, the numeral 10 denotes a fork having the shank 11 and the downwardly sweeping and transversely spaced apart branches 12. At 13 is a frame to which the branches 12 of the fork 10 are pivotally connected, for example, by means of a pivotal bolt 14, the frame being preferably of a general U-form somewhat as illustrated in Fig. 4. A wheel 15, having the center disk 16 and provided with a pneumatic tire 17, is journaled on a pin 18 that extends through the legs 13a of the U-frame 13. The legs 13a of the frame are extended beyond the bearing pin or axle 18 so as to support the outboard brackets 19, which, in this instance, project sidewisely from the legs 13a, the brackets 19 and the pivotal connection 14 being thus located on opposite sides of the axle 18.

The branches 12 of the fork have at their extremities the brackets 20, these being located directly below the respective brackets 19. Shown as reacting between each pair of brackets 19 and 20 is a compression spring 21, which may or may not be present. Extending through the brackets 19 and 20 are bolts 22 provided with washers 23. Reacting between the brackets 19 and the washers 23 are compression springs 24, these being shown as encircling the bolts 22. If springs 21 are present, the tension of these is opposed to the tension of springs 24 and serves to provide a double-cushioned relation between the fork 10 and the U-frame 13, holding them normally in a substantially balanced relation with each other.

It is to be observed that at one time the frame forms virtually a lever of the first order, since the weight is applied on the brackets 19 on one side of the fulcrum 18, and the power at the pivot 14. At another time the pivot 14 serves as the fulcrum for a lever of the third order, since the weight again may be considered as being applied on the brackets 19, but the power in this case being considered as the road shocks coming at the tangent point of the wheel directly below the axle 18, and applied at the axis of the latter. Thus is formed a double, or compound, fulcrumage that is mutually interlocked and serves to advantageously break the road impact shocks.

An outstanding advantage of the construction as herein disclosed, is that the level of the load-bearing plane 25 at the shank 11 need be only a small distance above the highest point of the wheel 17, thus accommodating a low-slung tongue or other element (not shown) of a vehicle (not shown).

For conveniently connecting the spring wheel assembly to a trailer dolly, such for illustration, as the one forming the subject of a copending application for patent Serial No. 782,505, now Patent No. 2,523,211, dated September 19, 1950, a collar 26 is provided. This collar has the wings 27 that take the bearing of the load, and these may be bolted or otherwise fastened to the frame of the dolly. The collar 26 holds a kingpin 28 on which, in the present instance, the shank 11 of the fork 10 is swiveled, and notably, the highest point of the wheel is below the bearing plane of the collar.

In general, the spring caster herein described, has what has become known as a knee-action.

Irrespective of the fact that the specific details of construction are necessarily shown and described by way of illustration in the foregoing disclosure, the invention is limited only by the terms of the following claims.

Having fully described the invention, what is claimed is:

1. A spring caster assembly comprising a wheel; a U-frame in which the wheel is rotatably mounted, the branches of the said U-frame being extended beyond the center of mounting of the wheel; a caster fork having a vertically disposed kingpin bearing and downwardly sweeping arms, the said arms terminating in substantial registry with but below the said branches of the U-frame; a pivotal connection between said branches and said arms, said connection being disposed remote from the center of mounting of the wheel; and compression spring means positioned to react between the said extensions of the U-frame and respective terminals of the downwardly sweeping arms.

2. A vehicle caster assembly, comprising a wheel; a U-frame in which the wheel is rotatably mounted; a weight-supporting fork straddling the U-frame; a pivotal connection joining the U-frame to the fork and serving as a fulcrum, said connection being disposed remote from the said mounting of the wheel in the U-frame; and a compression spring assembly positioned to react between the U-frame and the fork to normally urge said U-frame and said fork towards each other about said pivotal connection as a center.

3. A spring caster assembly according to claim 1, wherein the compression spring means include respective sets of oppositely-acting compression springs.

4. A spring caster assembly, comprising a wheel; a frame, intermediate the length of which said wheel is mounted for rotation; a caster fork pivoted adjacent one end of said frame for oscillation; and reaction spring means operatively disposed adjacent the opposite end of said frame for reaction between said frame and said caster fork, the rotative axis of said wheel being disposed between said reaction spring means and said pivotal connection of the caster fork with the frame.

5. The combination recited in claim 4, wherein the reaction spring means comprise a guide element arranged between caster fork and frame, said frame being slidably related thereto, and a spring operably disposed between said guide element and said frame.

6. The combination recited in claim 5, wherein the guide element extends above the frame, and the spring is a compression spring disposed between the frame and the upper end of the guide element.

7. The combination recited in claim 6, wherein the spring means includes, additionally, an oppositely acting compression spring disposed between the caster fork and the frame.

8. The combination recited in claim 7, wherein the guide element is a bolt providing for adjustment of spring tension.

EDWARD B. HEDGPETH.

REFERENCES CITED

The following references are of record in the file of this patent:

UNITED STATES PATENTS

| Number | Name | Date |
|---|---|---|
| 1,237,507 | Gregory | Aug. 21, 1917 |
| 2,051,627 | Weinmann | Aug. 18, 1936 |
| 2,227,875 | Boden | Jan. 7, 1941 |
| 2,282,506 | Wachter | May 12, 1942 |

FOREIGN PATENTS

| Number | Country | Date |
|---|---|---|
| 782,643 | France | Mar. 18, 1935 |